United States Patent [19]

Jaquet

[11] Patent Number: 4,538,061
[45] Date of Patent: Aug. 27, 1985

[54] RAILWAY WORK MACHINE

[75] Inventor: André Jaquet, Crissier, Switzerland

[73] Assignee: SIG Societe Industrielle Suisse, Neuhausen-Chutes du Rhin, Switzerland

[21] Appl. No.: 613,747

[22] Filed: May 23, 1984

Related U.S. Application Data

[63] Continuation of Ser. No. 340,971, Jan. 20, 1982.

[30] Foreign Application Priority Data

Sep. 25, 1981 [CA] Canada .................................. 6191/81

[51] Int. Cl.³ .............................................. G01J 1/20
[52] U.S. Cl. ..................................... 250/201; 104/7 B
[58] Field of Search ........................... 369/44, 45, 46; 104/7 B; 250/201, 203 R, 205, 221, 560; 356/141, 152

[56] References Cited

U.S. PATENT DOCUMENTS

| | | | |
|---|---|---|---|
| 3,381,626 | 5/1968 | Fagan et al. | 104/7 B |
| 3,706,284 | 12/1972 | Plasser et al. | 104/7 B |
| 4,004,852 | 1/1977 | Pentecost | 250/201 |
| 4,184,080 | 1/1980 | Massey | 250/560 |
| 4,260,882 | 4/1981 | Barnes | 250/205 |
| 4,292,513 | 9/1981 | Simmons et al. | 250/205 |
| 4,356,393 | 10/1982 | Fagfield | 250/221 |
| 4,371,946 | 2/1983 | Constantinides et al. | 250/203 R |

FOREIGN PATENT DOCUMENTS

| | | | |
|---|---|---|---|
| 57-18033 | 1/1982 | Japan | 369/45 |
| 57-24905 | 2/1982 | Japan | 250/201 |

OTHER PUBLICATIONS

Research Disclosure, No. 184, Aug. 1979, Apparatus for Tracking a Record Track on a Video Disc.

*Primary Examiner*—David C. Nelms
*Assistant Examiner*—J. Gatto
*Attorney, Agent, or Firm*—Anthony J. Casella; Gerald E. Hespos

[57] ABSTRACT

The machine comprises a device for shifting the track which is controlled by a device for the detection of its geometrical defects.

The detection device comprises three rail feelers to which there are connected a light-ray emitter (17), a screen (18) having two parallel delimiting edges (19, 20) and a receiver (21) having two identical photovoltaic cells (22, 23) arranged in such a manner that the sum of their irradiated surfaces $(u+d)$ is a constant and their difference $(u-d)$ is proportional to the displacements of the screen.

The signals produced by the two cells are processed in an electronic circuit comprising a totalizer (28) delivering a signal for the control of the displacement device proportional to the said difference $(u-d)$ and a piloting circuit (30, 41, 42) of the emitter to maintain the irradiation of the two cells constant by comparison of a signal proportional to the said sum $(u=d)$ with a reference signal $(S_0)$.

2 Claims, 6 Drawing Figures

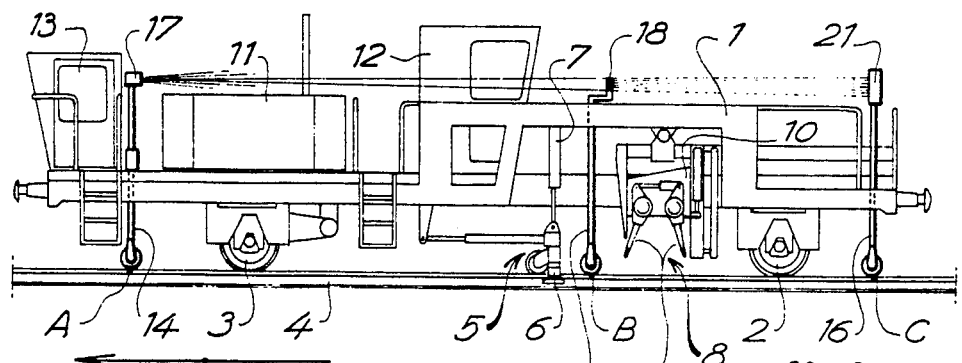
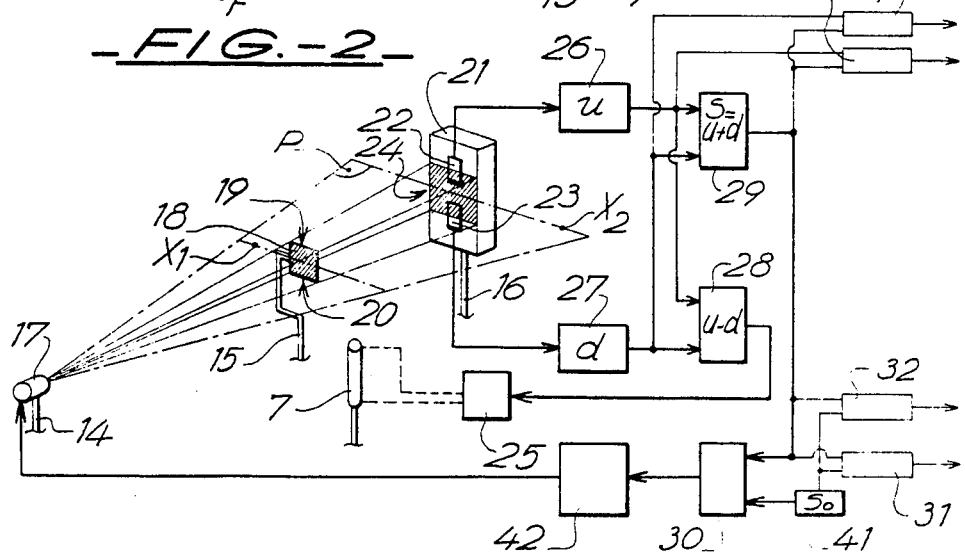
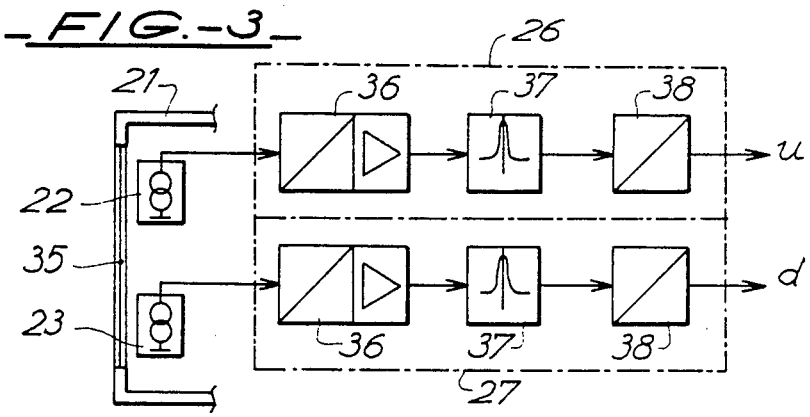

RAILWAY WORK MACHINE

This application is a continuation of application Ser. No. 340,971 filed on Jan. 20, 1982.

The object of the present invention is a railway work machine such as, for instance, a tamper or a clear-screener, equipped with a track-displacement device at least one member of which for control of the displacements of at least one tool is controlled by a device for the detection of geometric defects of the track so as to permit automatic correction of these defects as the work advances.

On this machine, the detection device comprises, as in certain known tampers, at least one series of three feelers, arranged one behind the other at three spaced points of a line of rails and to which there are connected respectively in order, a point source emitter of light rays, a screen which shuts off a part of these rays and has at least two parallel delimiting edges and a receiver having at least one group of two photosensitive elements spaced apart from each other in a direction perpendicular to the two edges of the screen and the difference in irradiation of which caused by the displacements of the screen in the direction perpendicular to its two edges gene rates a difference signal for the control of the regulating member which signal is representative of the distance between the axis of symmetry of the edges of the screen with respect to a reference plane defined by the point source of light and the axis of symmetry of the two photosensitive elements of the receiver.

On one known tamping machine described in U.S. Pat. No. 3,270,690 the detection device of which has these characteristics, the two photosensitive elements of the receiver are formed of two aligned rows of small photoelectric cells in which each of these small cells gives off an invariable electric signal as soon as a certain irradiation threshold has been reached. The two edges of the screen define in a given direction an opening made in a plate forming a mask around said opening so that the beam of light, calibrated by said opening, illuminates an equal number of small cells of the receiver in each of their two rows when the axis of symmetry of these two edges is located in the said plane of reference. When the screen is moved, for instance when the feeler to which it is connected passes over a hump or a hollow in the line of rails, an imbalance is created in the number of cells irradiated in the two rows and the amount of this imbalance, that is to say the difference in the number of cells irradiated in one row with respect to the other, is proportional to the amplitude and significance of the direction of the defect in levelness detected. In this system, the use of small photoelectric cells of the all-on-all-off type has the great advantage of making it insensitive to variations in the intensity of the irradiation of the cells once their emission threshold has been passed, caused either by fluctuations in ambient illumination or by accidental variations in the intensity of the light source or by a combination of these two phenomena.

Furthermore, the effects of diffraction of the light on the two edges of the screen produce no error on the difference signal when the source of light and the axes of symmetry of the edges of the screen and of the rows of cells of the receiver are located in the reference plane due to the symmetry of these effects on opposite sides of this plane in each of these two rows of cells.

On the other hand, in order to obtain sufficient precision, a large number of small cells is necessary to cover a normal measurement path since the increment in the measurement of the defect detected is represented here by a variable which is proportional to that of one of these cells. Therefore, the reliability of such an arrangement is dependent on a large number of components and their quality, and its precision is limited by the minimum dimension of the cells of the all-or-nothing type which are on hand or which can be manufactured.

Tamping machines are also known in which the detection device, based on a different system, comprises an emitter with point source of light, a receiver having two spaced photovoltaic cells of the same width one of which, however, is twice the lenght of the other, and a shutter screen having a single delimiting edge. These elements are arranged in such a manner that the three detected points of the line of rails being aligned, the shadow cast by the screen defined by the single edge masks only half of the longer cell. In this way half of the surface of the double cell and all of the surface of the single cell are irradiated. As these two cells give off a signal which is proportional to their irradiated surface and to the intensity of their irradiation, the resultant difference signal is zero in this case, due to the equality of the two terms of this difference, and this result remains unchanged whatever the variations of the intensity of the irradiation of the two cells. On the other hand, as soon as the alignment of the three points detected is broken for example upon passage from a hump to a depression, the difference signal assumes a given value other than zero which is not necessarily proportional to the amplitude of the hump or depression despite the corresponding proportionality of the irradiated surfaces of the two cells, due to the fact that the value of this difference signal is factored by that of the intensity of the irradiation which is only very rarely a constant. Furthermore, the diffraction effects of the light on the single edge of the screen are not symmetrical here with respect to the zero of the system since only the double cell is affected thereby. However, this arrangement gives satisfaction with respect to its purpose, which is to permit the correction of geometrical defects of the track by means of a displacement device of all-or-nothing type for which the reliability of the zero is alone important and in which no precise information or acknowledgement relative to the amplitude of the defect detected is required.

The object of the invention is to permit the creation of a signal proportional to the amplitude of the geometrical defect detected, of analog type, the precision of which is not changed, within the limits of normal use, by the variations of the intensity of illumination of the photosensitive elements and by the diffraction effects of the light on the edges of the screen, the thinness of which is not limited by the minimum dimensions of the photosensitive elements which can be used and the reliability of which is not dependent on too large a number of these elements. This in order to be able by means of this signal to assure a proportional control of the member for the adjustment of the displacements of the track displacement tool such as, for instance, the feed servovalve of a hydraulic jack for the actuating of a hoisting clamp as well as to permit the obtaining of an indication as to the effective amplitude of the defects detected along the work path when the latter is desired.

For this purpose, the machine of the invention, which is of the type first mentioned above, is characterized by the fact that the two photosensitive elements of the receiver of its detection device are formed of two cells of identical dimensions and electrical characteristics, each connected to a processing circuit which delivers an output signal proportional to their irradiated surface and to the intensity of their irradiation; by the fact that the two projected images of the two edges of the screen onto the receiver are each located in the middle of one of these two cells when the axis of symmetry of these two edges is located in the reference plane; by the fact that the processing circuits of the two signals of the cells are connected to a totalizer which delivers a difference control signal for the adjustment member which is proportional to the difference in the values represented by these two signals; by the fact that it furthermore comprises a circuit for the detection of the intensity of the irradiation of the two cells of the receiver in which there is integrated at least one photosensitive cell delivering an output signal proportional to the said intensity; and by the fact that the output of said circuit is connected to a pilot circuit for the emitter which comprises a comparator one input of which is connected to the output of the detection circuit while the other input is connected to a generator of a reference signal representative of an instruction irradiation intensity and the output of which is connected to a feed regulator of the point luminous source of the emitter.

In this way, due to the combination of the geometrical arrangement of the cells and of the screen with respect to the plane of reference and the piloting of the emitter, the difference control signal is exclusively proportional to the difference in the irradiated surfaces of the two cells, due to the fact that the value of the intensity of their irradiation which could be a factor of variation is maintained constant as a pre-established instruction value, and as this difference is itself proportional to the amplitude of the defect detected, the difference signal in question is in the final analysis exclusively proportional to the said amplitude. Furthermore, the relative position of the projected images of the two edges of the screen on the receiver with respect to that of the two cells has the result that the sum of their irradiated surfaces is a constant equal to the total surface of each of them, and this feature permits the use of these same two cells in the circuit for the detection of the intensity of their irradiation. This possibility as well as others inherent in the invention will become clearly evident from the following description.

The accompanying drawing shows, by way of example, two embodiments of the railway work machine in accordance with the invention.

FIG. 1 is an overall view of the machine having the parts common to its two embodiments.

FIG. 2 is a diagram of the detection device of the first embodiment.

FIG. 3 is a detailed diagram of a part of said device.

Figure 4:
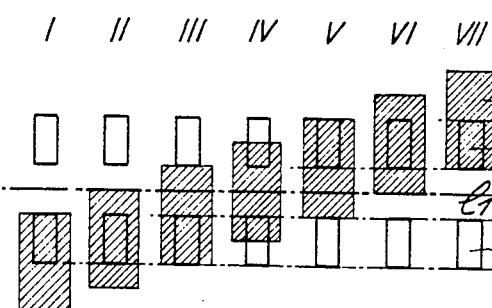
FIGS. 4 and 5 are diagrams illustrating the geometrical principle applied.

The railway work machine shown in FIG. 1 is a tamper-leveller-shifter whose chassis 1 rests via two axles 2 and 3 on a railway track of which one line of rails 4 is visible.

This machine is of the type which has a track-displacement device 5 of which there can be clearly noted the lifting tool 6 for the line of rails 4 and its hydraulic actuating jack 7, and a ballast tamping device 8 of which there can be noted a pair of tools 9 mounted on a chassis 10 which is movable vertically, these two devices being installed between the two axles 2 and 3. The energy necessary for the displacement of the machine and the actuating of its tools is supplied by a power plant 11. A tool control and drive station is installed in a central cab 12 which provides a view of said tools and a driver station is installed in a front cab 13, the direction of advance in work of the machine being indicated by the arrow f.

It may be briefly recalled here that as this type of machine advances in its work, the two lines of rail are placed or replaced in the desired alignment or curve by the displacement device 5 while the seat of the ties is consolidated by tamping the underlying ballast by means of the tamping device 6, this upon each step of advance corresponding to the number of ties which this last-mentioned device can tamp at the same time. The displacement of the track takes place automatically, for leveling as well as straightening, under the control of a device for the detection of its defects in alignment or curvature by which there are controlled the members for adjusting the displacement tools, such as, for instance, the feed servovalve of the jack 7 actuating the lifting tool 6 with respect to the leveling of the line of rails 4.

The detection device, shown as example for the leveling, is visible in FIG. 1 as well as in FIG. 2 in its first embodiment. This device comprises a series of three feeler rollers 14, 15 and 16 arranged one behind the other at three spaced points A, B and C of each of the two lines of rails. To these feelers there are connected respectively in the order mentioned a light-ray emitter 17 of point source, a screen 18 which delimits a part of these rays, here in the form of an opaque rectangular mask having two parallel delimiting edges 19 and 20 spaced apart in the direction vertical to the plane of the track and a receiver 21 having a group of two photovoltaic cells 22 and 23 of identical dimensions and electrical characteristics, here of rectangular shape, which are spaced apart and aligned in a direction perpendicular to the two edges of the screen 18.

The geometrical arrangement of these elements, emitter, screen and receiver, is determined dimensionnally and as a function of the differences between the intermediate feeler point B and the end points A and C in such a manner that the projected images of the two edges 19 and 20 of the screen 18 which define its shadow 24 on the receiver 21 are each located at the center of one of the two cells 22 and 23 when the axis of symmetry $X_1$ of these two edges is located in the reference plane P defined by the point source of light of the emitter 17 and the axis of symmetry $X_2$ of the two cells in question.

In this way, the sum of the two irradiated surfaces of the two cells 22 and 23 is equal to the total surface of each of them, since the shadow cast by the screen 18 masks one-half of each of them and this sum remains constant when the screen 18 is moved in the direction perpendicular to its edges upward or downward within limits which will be clarified further below with reference to FIGS. 4 and 5, the height of the shadow cast by the screen being a constant. Furthermore, the difference in the two irradiated surfaces of the two cells 22 and 23 is zero in this position, since they are equal, which is indicative of alignment of the three points A, B and C of the line of rails 4 provided that the three distances between the point source and the two aforementioned axes of symmetry of the line of rails 4 are made equal. Finally, it also results from this geometrical arrangement that under this same condition this difference of the two irradiated areas of the two cells 22 and 23 is proportional to the amplitude of the lack of alignment of the point B of the line of rails 4, sensed at the place of the screen 18, with respect to the straight line A—C.

These effects are utilized for the production of a signal for the control of the servovalve 25 of the hydraulic jack 7 for the actuating of the lift tool 6 on basis of the signals given off by the two photovoltaic cells 22 and 23. Each of these two cells is connected for this purpose to a processing circuit 26, 27 respectively, delivering a signal u or d respectively of continuous voltage proportional both to their irradiated surfaces $S_1$ and $S_2$ and to the intensity E of their irradiation, namely $u=k.S_1E$ and $d=k.S_2E$. These two processing circuits are connected to a totalizer 28 which delivers an output signal which is proportional to the difference $u-d$ in the values represented by these two signals and to a second totalizer 29 which delivers an output signal S which is proportional to the sum $u+d$ of these same values. This second totalizer and its connections constitute a circuit for the detection of variations of the intensity of the irradiation of the two cells 22 and 23 due to the fact that the sum of their irradiated surfaces is a constant. The output of the totalizer 28 is connected to the feed servo-valve 25 of the jack 7 actuating the lift tool 6, while the output of the second totalizer 29 is connected to a piloting circuit of the emitter 17, comprising a comparator 30 one input of which is connected to the said second comparator and the other input of which is connected to a generator 41 of a reference signal representing a reference radiation intensity $S_0$. The output signal of this comparator 30, which is repre sentative of an excess of $S>S_0$ or an insufficiency $S<S_0$ of radiation of the two cells 22 and 23 is directed to a feed regulator 42 of the point light source of the emitter 17, which in its turn is connected to the latter.

In this way, the control signal $u-d$ of the servovalve 25 is exclusively proportional to the difference in the irradiated surfaces $S_1$ and $S_2$ of the two cells, due to the maintaining of the intensity of the irradiation of these two cells at an invariable value equal to the instruction value established by the generator 41, this maintenance being obtained by the piloting circuit of the emitter 17. Since furthermore this difference in surfaces $S_1-S_2$ is proportional to the amplitude of the mis-alignment detected at point B, the control signal in question is proportional solely to the said amplitude.

The conditions for use of the control-signal $u-d$ are a function of the geometrical arrangement applied and the size of the photovoltaic cells used. These conditions are illustrated in FIGS. 4 and 5.

Figure 5:
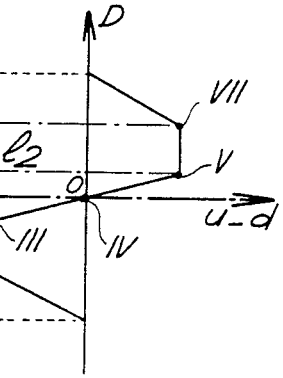

FIG. 4 shows seven characteristic positions marked I to VII, each along the course of the projected shadow zone 24 of the screen 18 on the two cells 22 and 23 of the receiver and FIG. 5 shows the corresponding variations of the control signal $u-d$ as a function of this path. It follows from these two diagrams that the amplitude of the displacement of the shadow 24 which can be used to supply the signal proportional to the geometrical defect detected extends from position III to position V, that is to say over a path $l_1$ equal to the length of a cell and that the total amplitude of the displacement of the projected shadow in question which can be used to supply a signal which is indicative of the position of the shadow with respect to the zero of equilibrium extends from position I to position VII, that is to say over a path $l_2$ equal to the sum of one cell length plus twice the distance between the cells.

These characteristics are therefore excellently adapted to proportional control by servovalve and the establishing of an acknowledgement as to the correction work carried out, for instance in the form of a graph obtained by means of a pen controlled by the signal in question due to the precision of the latter along the entire proportional measurement path $l_1$. These characteristics are also suitable for an all-or-nothing control with switching of several speeds or else for pure all-or-nothing control with the advantage of being able precisely to define a zone of hysteresis due to the total usable path $l_2$ which it is possible easily to adapt to the requirements by varying the distance between the two cells.

Furthermore, it is possible in a very simple manner to trigger indicating or alarm circuits in case of insufficiency or excess of the total irradiation of the two cells, for instance upon a sudden accidental drop in the power of the emitter below the operating threshold or violent interference of parasitic light rays, as well as in case of insufficiency of relative irradiation of each cell with respect to the total irradiation of the two cells for special applications such as, for example, automatic limiting of the overlifting of the track.

The means adapted to trigger such circuits are shown in thin lines in the diagram of FIG. 2. They are composed of four comparators 31, 32, 33 and 34. The first two 31 and 32 are connected to the totalizer 29 which delivers the output signal $u+d$ proportional to the sum of the signals coming from the two cells, which is indicative to the total intensity of irradiation of the two cells, and to the generator 41 delivering the references signal $S_0$.

The comparator 31 is developed to supply an alarm signal which indicates an excess of irradiation of the two cells as compared with the reference signal $S_0$ and the comparator 32 is developed to supply an alarm signal which is indicative of insufficiency of irradiation as compared with this same reference sinal $S_0$.

The other two comparators 33 and 34 have a first input connected to the totalizer 29 delivering the signal $u+d$ and a second input connected, in the case of the comparator 33, to the processing circuit 26 which delivers the signal u coming from the cell 22 and in the case of the comparator 34 to the processing circuit 27 which delivers the signal d coming from the cell 23.

These two comparators 33 and 34 are developed to supply, by weighting of the input signal $u+d$ and by comparison of this weighted signal $k(u+d)$ with the other input signal u or d respectively, an output signal $u<k(u+d)$ or $d<k(u+d)$ respectively which is indicative of relative, insufficient irradiation of each cell 22 and 23 with respect to the total irradiation of these two cells.

The nature of the point source of light of the emitter may be any whatsoever but in order to optimalize the advantages provided by the invention with respect to the independence of the measurement from variations in the total irradiation of the cells it is advisable to equip the emitter 17 with a point source of light consisting of a diode emitting infrared rays which is electronically modulated at a high frequency so as to obtain the best possible discrimination with parasitic ambient light, particularly the light of the sun.

In this case, illustrated in FIG. 3, the receiver 21 is equipped with an optical filter 35 suitable for infrared rays and each of the two processing circuits 26 and 27 for the signals produced by the two photovoltaic cells 22 and 23, shown in detail in this figure, has a current-voltage converter, with amplifier 36, a bandpass filter 37 centered on the modulation frequency of the diode of the emitter and a converter 38 for converting alternating voltage into continuous voltage delivering the signals u and d respectively.

By way of additional advantages provided without cost by this arrangement, and which are independent of the purpose sought, attention is called to the fact that light sources of this type are static elements of high reliability, long life and low consumption, giving a very sharp image without danger to the eye and excluding any dazzling or confusion with the signals of the track, these last mentioned advantages being particularly valuable at a railway work site.

Figure 6:
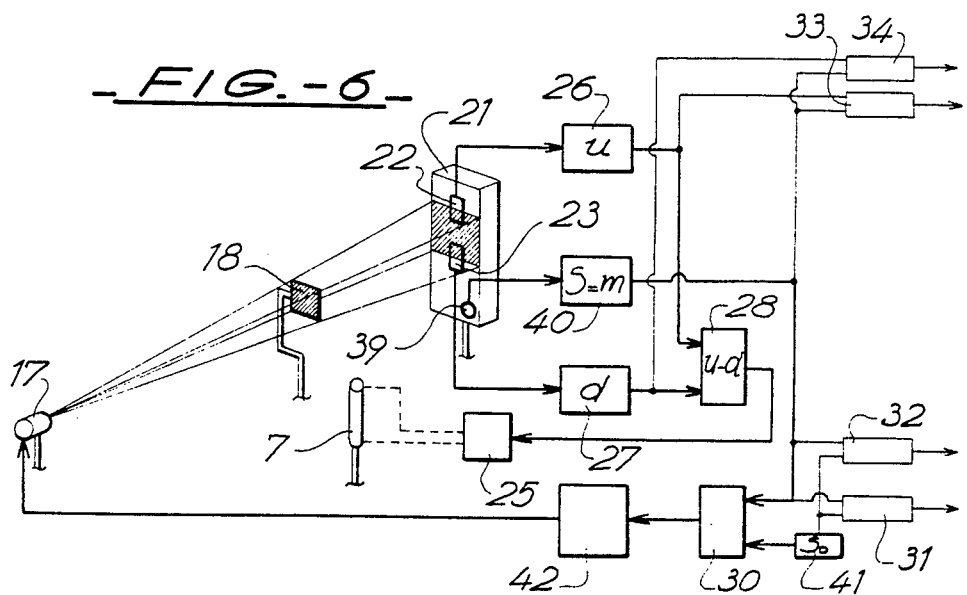
FIG. 6 is a diagram of the detection device of the second embodiment.

In the second embodiment of the machine of the invention, which is illustrated in FIG. 6, the geometrical arrangement of the emitter 17, the screen 18 and the two cells 22 and 23 of their receiver 21 remains unchanged, as well as the connections of these two cells with their processing circuits 26 and 27 which supply continuous voltage signals u and d, respectively, proportional to their irradiated sur faces and to the intensity of their irradiation as well also as the connections of these two circuits with the totalizer 28 which delivers an output signal which is indicative of the difference u−d between the values represented by these two signals. This is why these elements bear the same reference numbers, as do furthermore the components of the piloting circuit of the emitter 17, that is to say the reference signal generator 41, the comparator 30 and the feed regulator 42. Only the circuit for the detection of the intensity of the irradiation of the two cells 22 and 23 differs, which here no longer integrates these two cells but rather a third cell 39 arranged in the field of irradiation of the two cells 22 and 23, in this case on the receiver 21 below the two cells in question, so as to be irradiated by the emitter for at least the entire useful path $l_2$ defined previously and shown in FIG. 4.

This third cell 39 is connected to a processing circuit 40 of the same nature as the two circuits 26 and 27, delivering an output signal S=m of continuous voltage proportional to its irradiated surface and to the intensity of its irradiation but which is in fact here indicative only of the variations of this intensity since its irradiated surface remains constant during the useful displacements of the shadow thrown by the screen 18. Therefore, the output of this pro cessing circuit 40 supplies a signal of the same significance as that supplied by the second totalizer 29 of the first embodiment. For this reason this output is connected directly to an input of the comparator 30, while the other input of this comparator is connected to the generator 41, as already stated above.

The piloting of the emitter 17 is effected in precisely the same manner as in the first embodiment, by comparison of a signal S which is proportional to the intensity of the irradiation of the two cells with a pre-established reference signal $S_0$.

In this second embodiment, the comparators 31 to 34 which generate indicating or alarm signals are connected in the same manner as in the first embodiment and for the same purposes.

Of course, the detection device described in its two embodiments for the leveling of the track is also applicable for straightening, by simple rotation of the screen 18 and of the receiver 21 by 90°.

It is also possible to apply it for combined leveling and straightening. In this case, the receiver has two groups of two cells arranged along two Cartesian coordinate axes and the screen has two groups of two corresponding parallel delimiting edges, each group of cells being connected to a circuit identical to the one described. In this case also it is preferable to use a diaphragm screen in which the two groups of parallel edges define a rectangular or square opening by which a beam of light of corresponding cross section is calibrated in such manner as to project a light image in place of a shadow image so as to avoid the shadow thrown by the support of the screen on the receiver. This variant in the conception of the screen is also suitable in the first embodiment described as well as in the second, with a limitation however in this latter case with respect to the position of the third cell 39 which must be present within the zone irradiated by the emitter, that is to say between the two cells 22 and 23.

Finally in low-cost variants the comparators 31 to 34 which generate indicating or alarm signals may not be integrated, in particular when the precision of the measurement is desired only under normal conditions of use or else when their role is to be assured by the operator himself.

What is claimed is:

1. A railway work machine comprising railway track displacement tool for correcting levelling and/or alignment defects of the railway track, at least one regulating member for adjusting the displacements of at least one of said tools, and a detection device for the detection of said defects, said detection device being connected to and controlling said regulating member and comprising, in combination, at least one series of three feelers arranged one behind the other at three spaced points of a line of rails of said railway track and to which there are connected, respectively in order, a point-source of light-rays emitter, a screen which masks off a part of said rays and has at least two parallel delimiting edges spaced apart from each other in the direction of the defect to be corrected, a receiver having at least one group of two photosensitive cell means for emitting electrical signals proportional to their irradiated surfaces and to the intensity of their irradiation, said two cell means having identical dimensions and electrical characteristics and being spaced apart from each other and aligned in a direction perpendicular to said two delimiting edges of the screen, whereby the two projected images of said two delimiting edges of the screen fall each in the middle of one of said two cell means when the axis of symmetry of the two delimitting edges is located in a reference plane defined by said point-source of light-rays and the axis of symmetry of said two cell means, and the difference of the irradiated surfaces of said cell means is proportional to the amplitude of the detected defects, a processing circuit for the signals emitted by said two cell means comprising a first totalizer which delivers a control signal proportional to the difference between the values represented by said signals, which signal is used as a control signal for said regulating member, a second totalizer which delivers a signal proportional to the sum of the values represented by said signals, and a pilot circuit for said emitter comprising a comparator having a first input connected to said second totalizer and a second input connected to a generator of a reference signal representative of an instruction irradiation intensity and the output of which is connected to a feed regulator for said point-source of light-rays of the emitter, whereby the sum of the irradiated surfaces of said two cell means is a constant equal to the surface of one of them and therefore the signal delivered by the second totalizer is only representative of the intesity of irradiation of said two cell means and this intensity is maintained as a constant equal to the instruction intensity, while the value of the control signal is exclusively proportional to the difference of the irradiated surfaces of said two cell means and therefore said value of the control signal may also be used as in indication of the actual amplitude of the detected defects.

2. A railway work machine comprising railway track displacement tools for correcting levelling and/or alignment defects of the railway track, at least one regulating member for adjusting the displacements of at least one of said tools, and a detection device for the detection of said defects, said detection device being connected to and controlling said regulating member and comprising, in combination, at least one series of three feelers arranged one behind the other at three spaced points of a line of rails of said railway track and to which there are connected, respectively in order, a point-source of light-rays emitter, a screen which masks off a part of said rays and has at least two parallel delimiting edges spaced apart from each other in the direction of the defect to be corrected, a receiver having at least one group of two photosensitive cell means for emitting electrical signals proportional to their irradiated surfaces and to the intensity of their irradiation, said two cell means having identical dimensions and electrical characteristics and being spaced apart from each other and aligned in a direction perpendicular to said two delimiting edges of the screen whereby the two projected images of said two delimiting edges of the screen fall each in the middle of one of said two cell means when the axis of symmetry of the two delimiting edges is located in a reference plane defined by said point-source of light-rays and the axis of symmetry of said two cell means, and the difference of the irradiated surfaces of said cell means is proportional to the amplitude of the detected defects, a processing circuit for the signals emitted by said two cell means comprising a totalizer which delivers a control signal proportional to the difference between the values represented by said signals, which control signal is used as a control signal for said regulating member, a third photosensitive cell means located in the field of irradiation of said two cell means which is not influenced by the projected shadow of the screen, a shaping circuit connected to said third cell means and delivering an output signal proportional to the intensity of irradiation of said third cell means, and a pilot circuit for the emitter comprising a comparator having a first input connected to said shaping circuit and a second input connected to a generator of a reference signal representative of an instruction irradiation intensity and the output of which is connected to a feed regulator for said point-source of light-rays of the emitter, whereby the intensity of irradiation of said two cell means of the receiver is maintained as a constant equal to the instruction intensity and therefore the value of the control signal is exclusively proportional to the difference of the irradiated surfaces of said two cell means and said value of the control signal may also be used as an indication of the actual amplitude of the detected defects.

* * * * *